Dec. 24, 1968  E. J. ROVSEK  3,418,045
INTERMITTENTLY OPERATED MOVIE FILM PROJECTOR
FOR PROJECTING STILL PICTURES
Filed Aug. 24, 1966  3 Sheets-Sheet 1
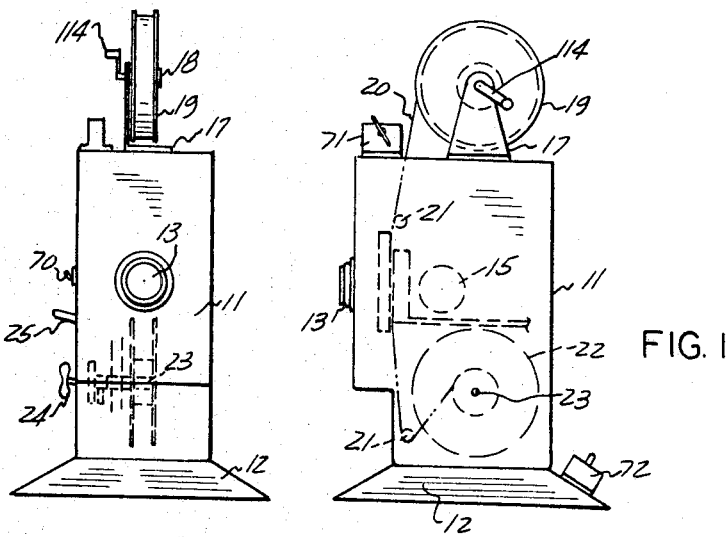
INVENTOR
EDWARD J. ROVSEK
BY Cullen, Sloman, & Cantor
ATTORNEYS

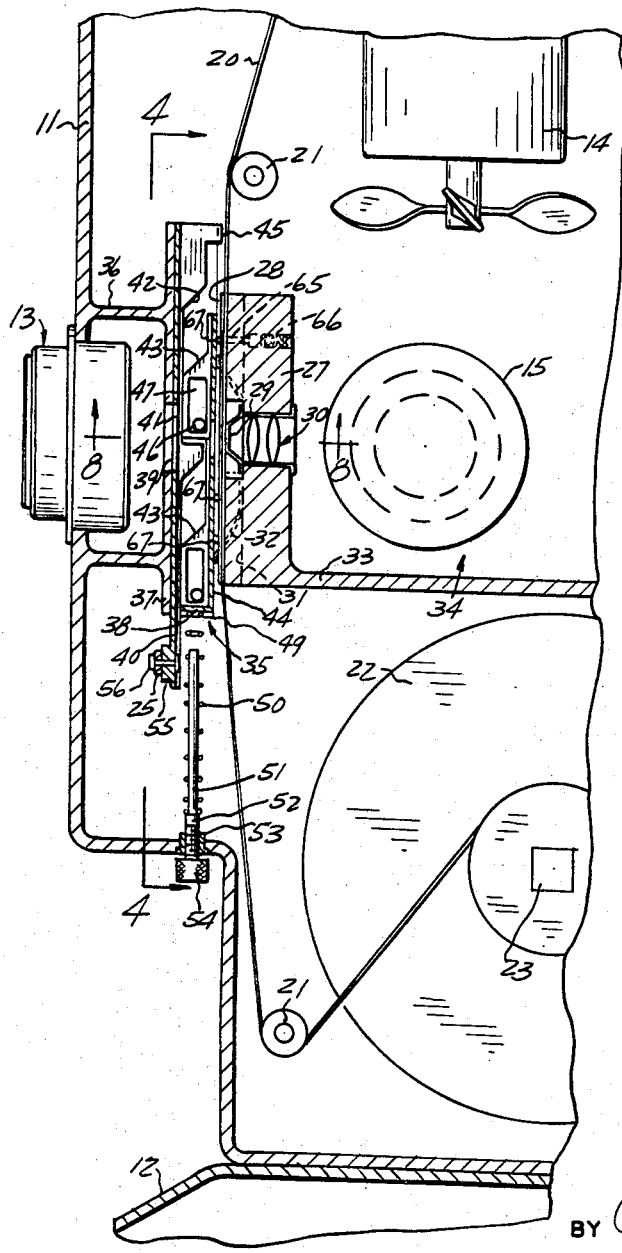

Dec. 24, 1968

E. J. ROVSEK 3,418,045

INTERMITTENTLY OPERATED MOVIE FILM PROJECTOR
FOR PROJECTING STILL PICTURES

Filed Aug. 24, 1966

INVENTOR
EDWARD J. ROVSEK

BY Cullen, Sloman, & Cantor
ATTORNEYS

United States Patent Office 3,418,045
Patented Dec. 24, 1968

3,418,045
INTERMITTENTLY OPERATED MOVIE FILM PROJECTOR FOR PROJECTING STILL PICTURES
Edward J. Rovsek, Elk Rapids, Mich.
(P.O. Box 592, Dearborn, Mich. 48121)
Filed Aug. 24, 1966, Ser. No. 574,581
21 Claims. (Cl. 353—122)

ABSTRACT OF THE DISCLOSURE

A film projector for projection of movie film having a series of individual still pictures thereon, one frame at a time. The projector comprises, besides the conventional light source, lens assembly, film feeding and takeup elements, a film engaging stripper and a manually and intermittently operable film engaging device for advancing the film one frame at a time. Furthermore a series of film drivepins is included for projection into the marginal film apertures for intermittent driving engagement with the film, one frame at a time.

---

This invention relates to a film projector using movie film, and more particularly, to such projector which includes manually operable means for effecting only incremental, single, and successive frame movements of the film for projection of single pictures only upon a screen. This projector is designed for single picture feed only, not continuous feed as is used in the projection of motion pictures.

It is an object of the present invention to provide a novel form of film projector with the usual lens assembly condenser assembly, and light source, film delivery and takeup reels in conjunction with a manually or power operated means mounted upon the projector housing adapted for operative driving engagement with the film therein for effecting only intermittent, incremental, single frame feed movements thereof.

This and other objects will be seen from the following specification and claims in conjunction with the appended drawings, in which:

FIG. 1 is a side elevational view of the present projector.
FIG. 2 is a front elevational view thereof.
FIG. 3 is a fragmentary vertical section of the projector corresponding to FIG. 1, but on an increased scale.
FIG. 4 is a fragmentary partially broken away section taken in the direction of arrows 4—4 of FIG. 3.
FIG. 5 is a schematic wiring diagram.
FIG. 6 is a fragmentary vertical section corresponding to FIG. 3, partly broken away and illustrating a different form of film feed mechanism.
FIG. 7 is a fragmentary section taken in the direction of arrows 7—7 of FIG. 6.
FIG. 8 is a section taken in the direction of arrows 8—8 of FIG. 3, on an increased scale.

It will be understood that the above drawings illustrate merely a preferred embodiment of the invention, and that other embodiments are contemplated within the scope of the claims hereafter set forth.

The present film projector in one form is illustrated in FIGS. 1 through 5 and includes a substantially upright projector housing 11 upon base 12, and including a conventional lens assembly 13, fan 14, lamp 15 within suitable socket 16, and the supply film reel support 17.

The film supply reel 19 is journalled at 18 upon said support for delivering the developed movie film or transparency type of film 20 over the respective sprockets or other guides 21 onto the conventional type of takeup reel 22 journalled at 23. FIG. 2 illustrates, fragmentarily, a conventional type of film takeup spring motor 24, which is connected to the journal connection for the mounting of the film takeup reel 22.

In order to effect manual and incremental single frame advancements of the film 20 as desired by the operator there is employed a manually operable film feed mechanism which includes film advance lever 25, said film including along its margins the conventional film sprocket apertures 26.

The said film is movable over and relatively to the support 27 and between said support and the overlying stripper plate 28 mounted on said support and including aperture 29 in registry with the conventional lens condenser assembly 30 mounted on said support. The stripper plate opening 29 is adapted for cooperative registry with a single frame forming a part of the developed film 20, which may be of various sizes, for example, 8-mm.; super 8-mm.; 16-mm.; 35-mm.; or 8 x 11-mm. and 9½-mm., foreign made films.

The present projector is adapted for single frame projection of movie film of any of these sizes with the manually operable means for feeding controlled by suitable stop mechanism for limiting the incremental feed movement to a single frame at a time. This projector is designed for single picture feed only.

Support 27 has a pair of opposed slots 31 within which are positioned and anchored a pair of formed leafsprings 32 which project outwardly of the support for compressive engagement with first cam plate 44, hereafter described which forms a part of the film feed mechanism for normally spacing said cam plate and its film feed pins 67 outwardly of the film, except during feed movement thereof. The support 27 extends to and joins the webbing 33 forming a part of the projector housing to provide a chamber 34 for isolating the lamp 15 from the film takeup reel 22.

The film feed assembly generally indicated at 35 includes a channel type of cam guide housing 37 connected by a suitable web 36 to the projector housing, FIG. 3, and including opposed parallel sidewalls 38, said cam guide having a central aperture 39 in registry with the lens axis.

Forming a part of the manually operable feed mechanism 35 is the reciprocal cam plate 40 apertured at 41 for registry with the lens axis during film projection and which includes a pair of 45° longitudinally spaced feed drive cams 42. The latter cams are normally arranged in spaced relation to the feed advance cams 43 forming a part of the sidewall portions of the U-shaped slide 44, also slidably mounted within the guide 37 and loosely retained therein by the pair of longitudinally spaced pins 46 and associated slots 47 formed within the sidewalls of slide 44, the said slide 44 hereafter referred to as a first cam plate is furthermore apertured at 48, adapted for registry with the lens axis during the projection period.

The first cam slide 44 includes end wall 49, which is in abutment with the elongated coilspring 50 normally retaining the first cam plate 44 against forwarding sliding movement within its guide 37 and adapted to return the first cam plate 44 to the inoperative position shown when the manual operative means which effects advancement thereof has been returned to its initial position.

Elongated cam stop pin 51 having threaded shoulder 52 extends through the bushing 53 in the housing and terminates in the knob 54 facilitating adjustment and provides a means for limiting the longitudinal feed movement of the first cam plate 44 depending upon the size of film employed and the distance between film frames, since it is an objective of the present invention to limit the film feed movement to single frame movement of the said film.

The manually operable incremental feed means also includes the lever 25 pivotally mounted at 57 upon the housing and intermediate its ends pivotally connected at 56 to the boss 55 upon the outer end of the slide 40 hereafter referred to as the second cam plate, lever 25 being normally biased to the inoperative position relative to the slot 58, FIG. 4, by means of the coilspring 59 anchored at 60 to the housing and connected at 61 to the said lever.

Also pivotally connected at 62 to lever 25 is the outer end of the armature 63 which is adapted for power operated reciprocal movement with respect to the solenoid 64 which may be employed for timed intermittent actuation for operating the lever 25, if desired, for an automatic type of operation, but for intermittent feed movements of the movie film one frame at a time under powered control.

Referring to FIG. 3, a pair of spaced film positioning or anchor pins 65 are mounted movably within the support 27 biased inwardly by spring 66.

Mounted upon the first cam plate 44 forming a part of the feed mechanism are a plurality of longitudinally spaced pairs of film drivepins 67, which due to the action of the springs 32 are normally out of engagement with the film. Upon activation of the manually operable or solenoid powered means and the functioning of cams 42 and 43, pins 67 are moved transversely into operative, engagement with sprocket apertures 26 in film 20 for driving engagement therewith. A pair of the said pins 67 are in registry with locating pins 65 so that such lateral movement of pins 67 causes a disconnection of anchor pins 65 from the film retracting the same against the action of springs 66.

The second cam plate 40 adjacent one end has a projecting dog 45 which is adapted, in cooperation with cams 42 and 43, for operative engagement with the end wall of first cam plate 44 so that after cam plate 44 has moved transversely to interlock the pins 67 with the film, further longitudinal movement of second cam plate 40 will cause longitudinal movement of the first cam plate 44 transporting film 20 a distance equal to the center distance between frames. The adjustable stop 51 which limits the extent of feed movement of cam plate 44.

In operation, by rotating the film advance lever 25 around its pivot 57 relative to slot 58, the second cam plate 40 is moved longitudinally until stopped, and upon release of lever 25, by action of the spring 59, returns to the inoperative position known. The independently movable first cam plate 44 will return to the inoperative position shown in FIG. 3 by the action of spring 50 with leafsprings 32 first lifting cam 44 such that drivepins 67 are disengaged from film sprocket apertures 26. This corresponds to the film frame projection position.

A schematic wiring diagram is shown in FIG. 5, which includes a power source 68 connected into electrical circuit 69 connecting manual switch 70 and the related fan 14 and lamp 15 within the projector housing. The circuit also includes a switch and timer 71 connected with solenoid 64 and associated holdswitch 72 by which, as desired, the projector may be solenoid operated or hand operated through manual movement of lever 25 forming a part of the manually operable means.

*Alternate feed mechanism*

Referring to FIGS. 6 and 7 there is fragmentarily shown in conjunction with the present projector a modified form of film feed generally indicated at 73, including film advance lever 75, manually movable and retractable within arcuate slot 76 in said housing. As shown in FIG. 7, apertured boss 79 mounts journal rod 80, which rotatively supports the transverse journal 81 integral with and forming a part of the U-shaped master lever 82 pivotally mounted upon journal rod 80.

Film advance wheel 88 has a series of opposed pairs of sprockets 89, and has an axially connected externally splined shaft 90 rotatively mounted upon journal rod 80.

Ratchet wheel 91 with ratchet teeth 92, FIG. 6, is adapted for correct incremental single frame feed movement of a 16-mm. film frame. Ratchet wheel 91 is connected to a second ratchet wheel 93 adapted to effect incremental feed movements of an 8-mm. film. Both ratchet wheels are internally splined for sliding adjustable movements upon spline shaft 90 under the control of shifter fork 94 for locating the desired ratchet wheel with respect to ratchet drivepin 95.

The latter is yieldably mounted within boss 96 on master lever 82 and is biased forwardly by the coilspring 97. Ratchet pin 95 terminates in the outwardly extending pullpin 98 by which the drivepin 95 may be changed from one ratchet wheel to the other upon longitudinal adjustment of said ratchet wheels upon spline shaft 90 under the control of shifter fork 94, FIG. 6.

The film advance wheel 88 and its corresponding sprockets 89 are in operative driving engagement with the corresponding marginal apertures 69 of the film which moves over film roller 99 journalled upon studshaft 100. Roller 99 has a pair of transversely spaced annular grooves 101 adapted to cooperatively receive respective sprockets 89 on wheel 88, the said film moving between film advance wheel 88 and the support or guide roller 99.

Elongated coupling link 102 is pivotally connected at 103 to master lever 82, FIGS. 6 and 7, and at its opposite end is pivotally connected at 104 to the yoke link 105 which at its opposite end is fixedly secured to the Scotch yoke shaft 106.

The elongated retracting spring 110 anchored at 111 to the projector housing is connected at its opposite end at 104 to the end of coupling link 102 for normally biasing the master lever 82 and its handle 75 to the inoperative position shown.

The Scotch yoke shaft 106 has a flattened portion 107 which normally bears upon an interior wall of the pair of spaced Scotch yokes 108 which are connected as at 109 to the outer ends of the positioning pins 66. Accordingly, on activation of the master lever through movement of the lever arm 75 towards an advance position in its slot there will be an initial corresponding rotary movement of the yoke link 105 causing the Scotch yoke shaft to cam against the Scotch yokes for retracting the positioning pins 66, disengaging the same from the film 20. Further advance movement of the master lever 82 then causes longitudinal feed movement of the film by virtue of the fact that ratchet drivepin 95 upon the said master lever is in operative driving engagement with one of the sprocket wheels 91 or 93 for effecting an incremental rotation thereof a distance equal to the center distance between film frames on film 20.

As shown in FIG. 6, there are provided a pair of retractable stop pins 112 one of which is employed for limiting the advancing movement of lever arm 75 employed with respect to an 8-mm. film. The other retractable stop pins is employed to limit rotary movement of lever 75 in feeding 16-mm. film. Upon release of arm 75, spring 110 is effective for retracting said arm to the inoperative position shown in FIG. 6, with ratchet drive pin 95 moving loosely over the corresponding ratchet wheel repositioned for the next film feed movement.

In operation it is contemplated that the lever arm 75 may be manually reciprocated or advanced within slot 76 or could be under the control of armature 63 of solenoid 64′, FIG. 6, involved in an electrical circuit such as shown in FIG. 5. Armature 63 is pivotally connected to lever 82 as at 103.

The present construction thus illustrates at least two different types of manually operable means by which incremental, single picture feed movement of the particular film may be achieved for projection in timed sequence or in any desired sequence through the projector construction.

The primary object therefor is to employ movie type of film of from 1 to 100 feet in length which has been developed providing a transparent type of film which then may be employed in the present projector for projection upon a screen and for slowly advancing one film frame or picture at a time as in conventional slide projectors.

The advantage of the present construction, however, is that the movie type of film is used rather than individual transparencies. The time of projection of an individual picture is entirely up to the operator. It can be manually controlled using control lever 75 or can be intermittently controlled for feed movements one picture at a time depending upon the setting of timer 71 controlling the automatically operable solenoid. The present projector is thus designed for single picture feed only and not the continuous feed as is used in the projection of motion pictures. The present projector is for single picture projection of still pictures taken on movie film.

The present projector also includes film rewinding back onto feed reel 19, by manual actuation of rewind handle 114, for illustration. A suitable means is required to retract the film locating pins such as locating pins 66 of FIG. 6. This is accomplished by retracting the Scotch yokes 108 by rotating Scotch yoke shaft 106, such as by pivoting link 105 a short distance. Any other suitable mechanical means could be employed to retract and disengage pins 66 from film 20.

Having described my invention reference should now be had to the following claims.

I claim:

1. In a projector adapted for projection of movie-type film one picture or frame at a time, as distinguished from the continuous feed used in the projection of motion pictures;
   a housing mounting a lens, a condenser and light source;
   a film assembly removably mounted on said housing including film supply and takeup reels for movably positioning a developed movie film having a series of individual still pictures in registry with said condenser;
   an elongated film support in said housing mounting said condenser coaxially of said lens;
   an elongated film-engaging stripper plate spaced over and secured to said support having a central portion with a film opening adapted for registry with a single picture of a film movably positioned between said stripper plate and support;
   and manually operable means on said housing engageable with said film for intermittently advancing the same one still picture or frame at a time said stripper plate on opposite sides of its central portion being of reduced width, exposing the apertured margins of said film;
   said manually operable means including a series of film drivepins adapted for projection into said film apertures and for driving engagement with said film.

2. In the projector of claim 1, a transversely movable, spring-biased, longitudinally reciprocal first cam plate mounting said drivepins;
   and a cam guide in said housing slidably receiving said first cam plate.

3. In the projector of claim 1, a transversely movable, spring-biased, longitudinally reciprocal first cam plate mounting said drivepins;
   a cam guide in said housing slidably receiving said first cam plate;
   and an adjustable stop on said housing limiting longitudinal feed movement of said first cam plate.

4. In the projector of claim 1, a transversely movable, spring-biased, longitudinally reciprocal first cam plate mounting said drivepins;
   a cam guide in said housing slidably receiving said first cam plate;
   said guide and first cam plate having cooperating pin and slot connections, by which said drivepins, normally out of engagement with said film, move transversely into driving engagement with said film and longitudinally with the film;
   and spring means normally spacing said drivepins from said film.

5. In the projector of claim 1, a transversely movable, spring-biased, longitudinally reciprocal first cam plate mounting said drivepins;
   a cam guide in said housing slidably receiving said first cam plate;
   said guide and first cam plate having cooperating pin and slot connections, by which said drivepins, normally out of engagement with said film, move transversely into driving engagement with said film and longitudinally with the film;
   spring means normally spacing said drivepins from said film;
   spring-biased, retractable, film positioning pins on said support retainingly registerable with said film apertures during film projection;
   some of said drivepins being in axial registry with said positioning pins and adapted on said initial transverse movement of said first cam plate into operative engagement with said positioning pins retracting the latter.

6. In the projector of claim 5, movable means on said housing connected to said positioning pins for retracting them to disengage said film;
   and rewind means on said film supply reel for rotating the same.

7. In the projector of claim 1,
   an apertured pressure pad within said support in axial registry with said lens holding said film in sliding registry with said stripper plate.

8. In the projector of claim 1, a transversely movable, spring-biased, longitudinally reciprocal first cam plate mounting said drivepins;
   a cam guide in said housing slidably receiving said first cam plate;
   an adjustable stop on said housing limiting longitudinal feed movement of said first cam plate;
   the spring bias for said first cam plate including first spring means mounted over said adjustable stop normally retaining said first cam plate in inoperative position, and adapted to automatically return said first cam plate to inoperative position on release of said manually operable means;
   said spring bias also including second spring means on said support normally bearing against said first cam plate with its drivepins retracted from said film.

9. In the projector of claim 1, a transversely movable, spring-biased, longitudinally reciprocal first cam plate mounting said drivepins;
   a cam guide in said housing slidably receiving said first cam plate;
   a spring-biased second cam plate slidably mounted within said guide in normally opposed sliding engagement with said first cam plate, and adapted on initial longitudinal movement for cooperative registry with said first cam plate for moving the same transversely and on further movement for moving said first cam plate longitudinally;
   and a film advance lever pivotally mounted on said housing and connected to said second cam plate for reciprocally moving the same.

10. In the projector of claim 9, a solenoid on said housing including a reciprocal armature pivotally connected to said lever;
   and a manually controlled switch in an electric circuit to said solenoid.

11. In the projector of claim 10, said switch including an adjustable timer.

12. In the projector of claim 1, said manually operable means including a journal rod on said housing;
   and a master lever including a transverse bearing rotatably mounted on said journal rod.

13. In the projector of claim 1, said manually operable means including a rotatable film advance wheel having a series of spaced pairs of said pins therearound in operative driving engagement with said film;
   said wheel adapted for incremental rotary movements in one direction.

14. In a projector adapted for projection of movie-type film one picture or frame at a time, as distinguished from the continuous feed used in the projection of motion pictures;
   a housing mounting a lens, a condenser and light source;
   a film assembly removably mounted on said housing including film supply and take-up reels for movably positioning a developed movie film having a series of individual still pictures in registry with said condenser;
   an elongated film suport in said housing mounting said condenser coaxially of said lens;
   an elongated film-engaging stripper plate spaced over and secured to said support having a central portion with a film opening adapted for registry with a single picture of a film movably positioned between said stripper plate and support;
   and manually operable means on said housing engageable with said film for intermittently advancing the same one still picture or frame at a time, said manually operable means including a rotatable film advance wheel having a series of spaced pairs of sprockets therearound in operative driving engagement with said film;
   said wheel adapted for incremental rotary movements in one direction;
   a journal rod on said frame upon which said wheel is mounted;
   and a film advance lever pivotally mounted on said journal rod and operably connected to said film advance wheel.

15. In the projector of claim 14, said operable connection including a ratchet wheel coaxially mounted on said film advance wheel;
   and a spring-biased, yieldable ratchet drivepin mounted on said lever for intermittent, incremental driving engagement with said ratchet wheel on each advance pivotal movement of said lever.

16. In the projector of claim 15, a solenoid on said housing including a reciprocal armature pivotally connected to said lever;
   and a manually controlled switch in an electric circuit to said solenoid.

17. In the projector of claim 16, said switch including an adjustable timer;
   and a solenoid hold switch in the circuit for selective manual control.

18. In the projector of claim 14, said operable connection including a ratchet wheel coaxially mounted on said film advance wheel;
   a spring-biased, yieldable ratchet drivepin mounted on said lever for intermittent, incremental driving engagement with said ratchet wheel on each advance pivotal movement of said lever;
   and spring means connected to said lever for effecting return movement thereof.

19. In the projector of claim 14, said operable connection including a ratchet wheel coaxially mounted on said film advance wheel;
   a spring-biased, yieldable ratchet drivepin mounted on said lever for intermittent, incremental driving engagement with said ratchet wheel on each advance pivotal movement of said lever;
   and a retractable stop pin limiting rotary advance movement of said lever.

20. In the projector of claim 14, spring-biased, retractable film locating pins on said support retainingly registerable with said film apertures during film projection;
   a transversely adjustable yoke connected to each pin;
   a rotatable Scotch yoke shaft eccentrically connected to said yokes;
   and a coupling linkage interconnecting said lever and said Scotch yoke shaft whereby rotation of said lever retracts said film locating pins.

21. In the projector of claim 14, said operable connection including a 16-mm. film drive ratchet wheel and an interconnected 8-mm. film drive ratchet wheel, both slidably keyed axially to said film advance wheel;
   a spring-biased, yieldable ratchet drivepin mounted on said lever for intermittent, incremental driving engagement with one of said ratchet wheels on each advance pivotal movement of said lever;
   and a shift fork connected to said ratchet wheels for positioning one of said ratchet wheels relative to said ratchet drivepin.

References Cited

UNITED STATES PATENTS

| | | | |
|---|---|---|---|
| 1,087,083 | 2/1914 | Debrie | 352—169 |
| 2,368,779 | 2/1945 | Pyles et al. | 88—28 |
| 2,587,123 | 2/1952 | Dunning et al. | 88—28 |
| 2,790,349 | 4/1957 | Hauser | 88—28 XR |
| 2,971,435 | 2/1961 | Singleterry | 88—28 |
| 3,136,209 | 6/1964 | Briskin et al. | 352—224 XR |
| 3,295,427 | 1/1967 | Oswald | 95—14 XR |
| 3,301,628 | 1/1967 | Hellmund | 88—24 XR |

NORTON ANSHER, Primary Examiner.

RICHARD M. SHEER, Assistant Examiner.

U.S. Cl. X.R.

352—169; 353—95